Dec. 8, 1964   A. RUOZI   3,160,214
STALK AND ROOT LIFTING AND SHREDDING DEVICE
Filed Nov. 7, 1962   6 Sheets-Sheet 2
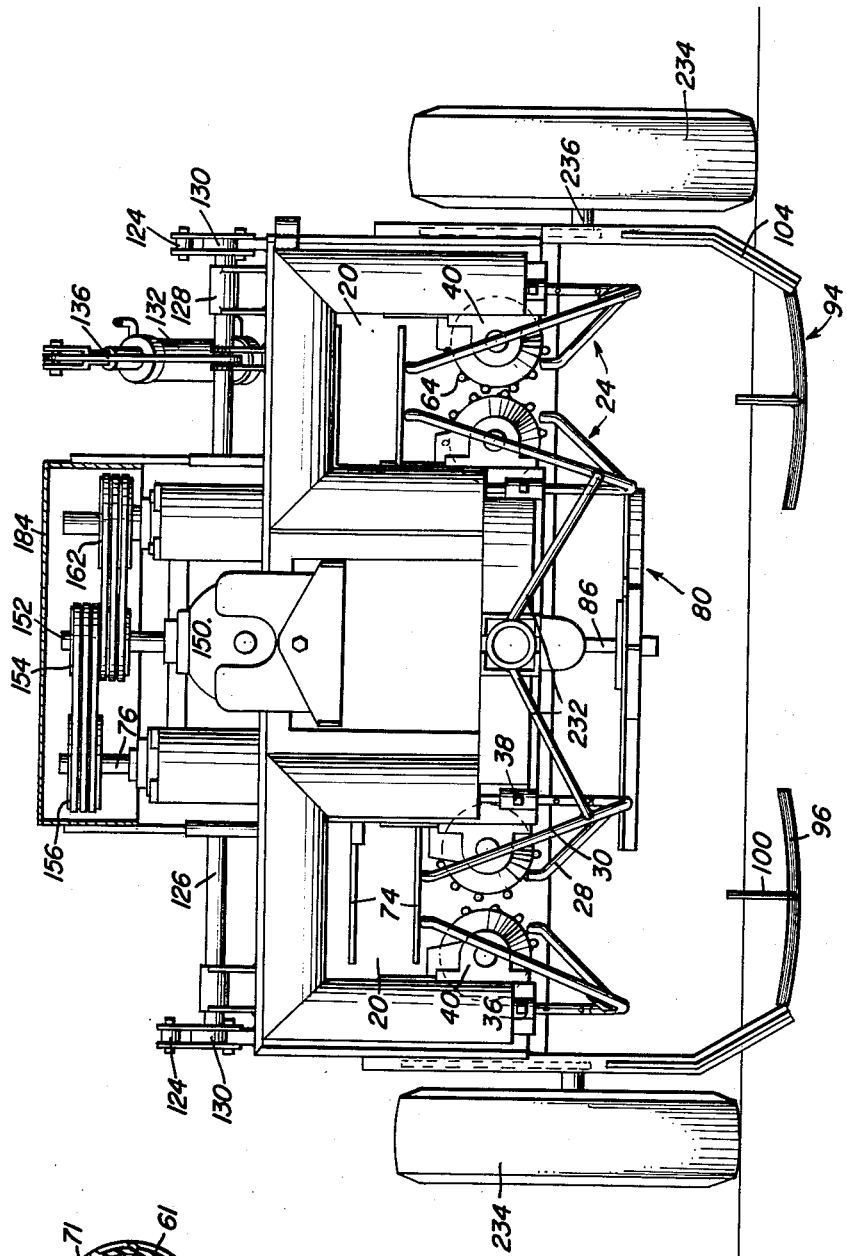
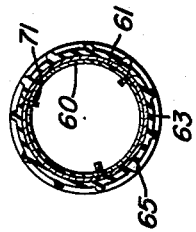
Aldo Ruozi
INVENTOR.
BY *Clarence A. O'Brien*
and *Harvey B. Jacobson*
Attorneys

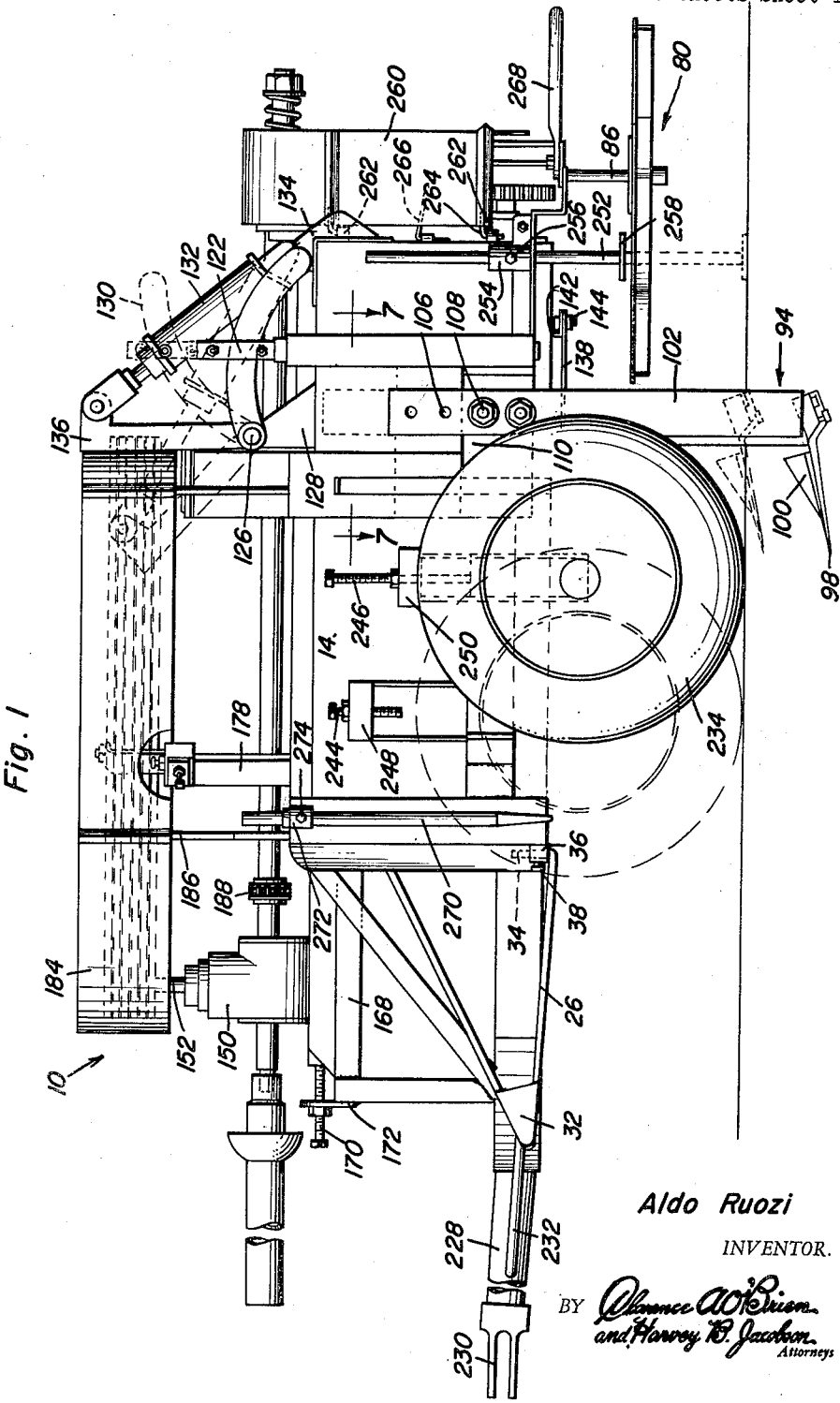

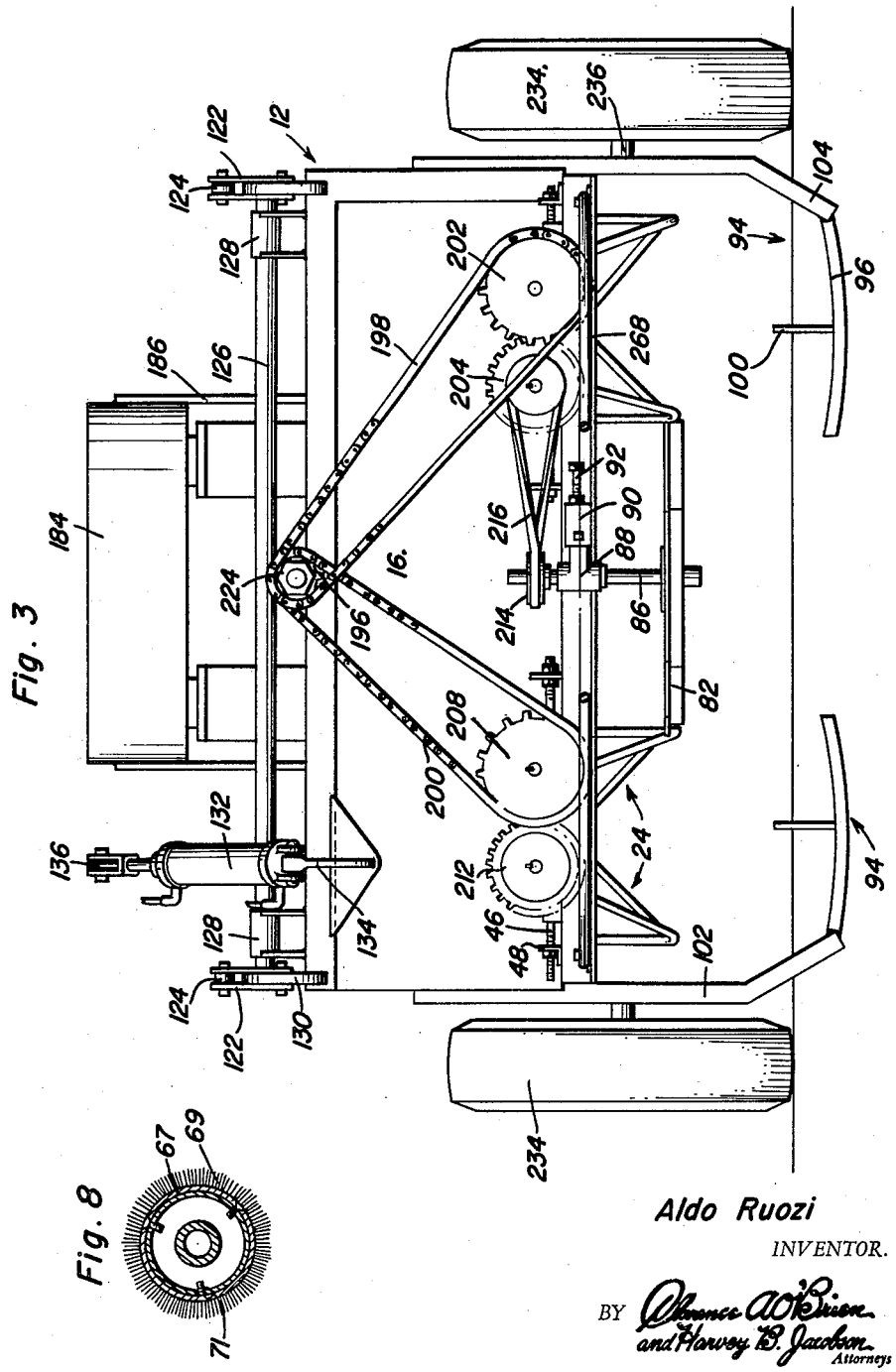

Aldo Ruozi
INVENTOR.

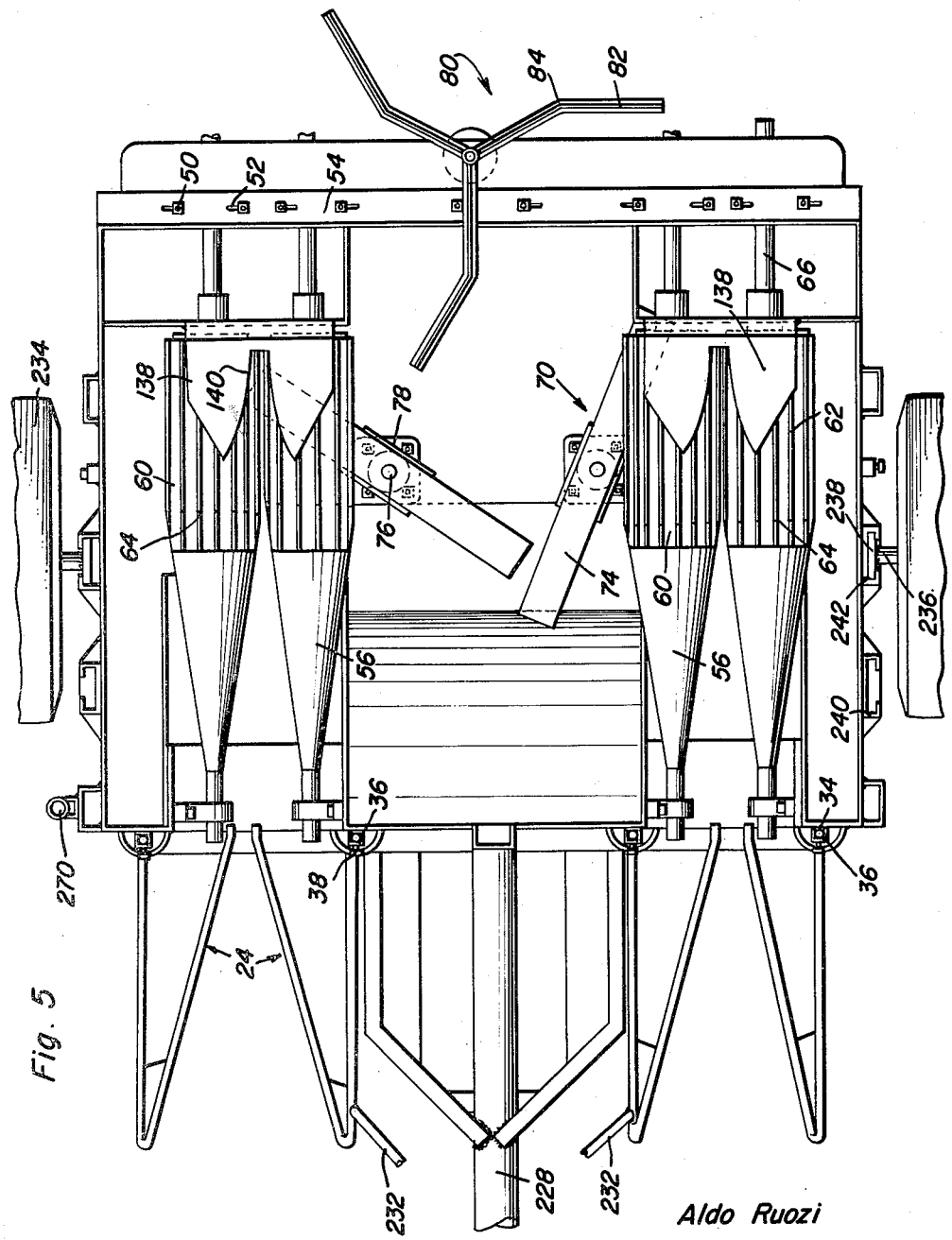

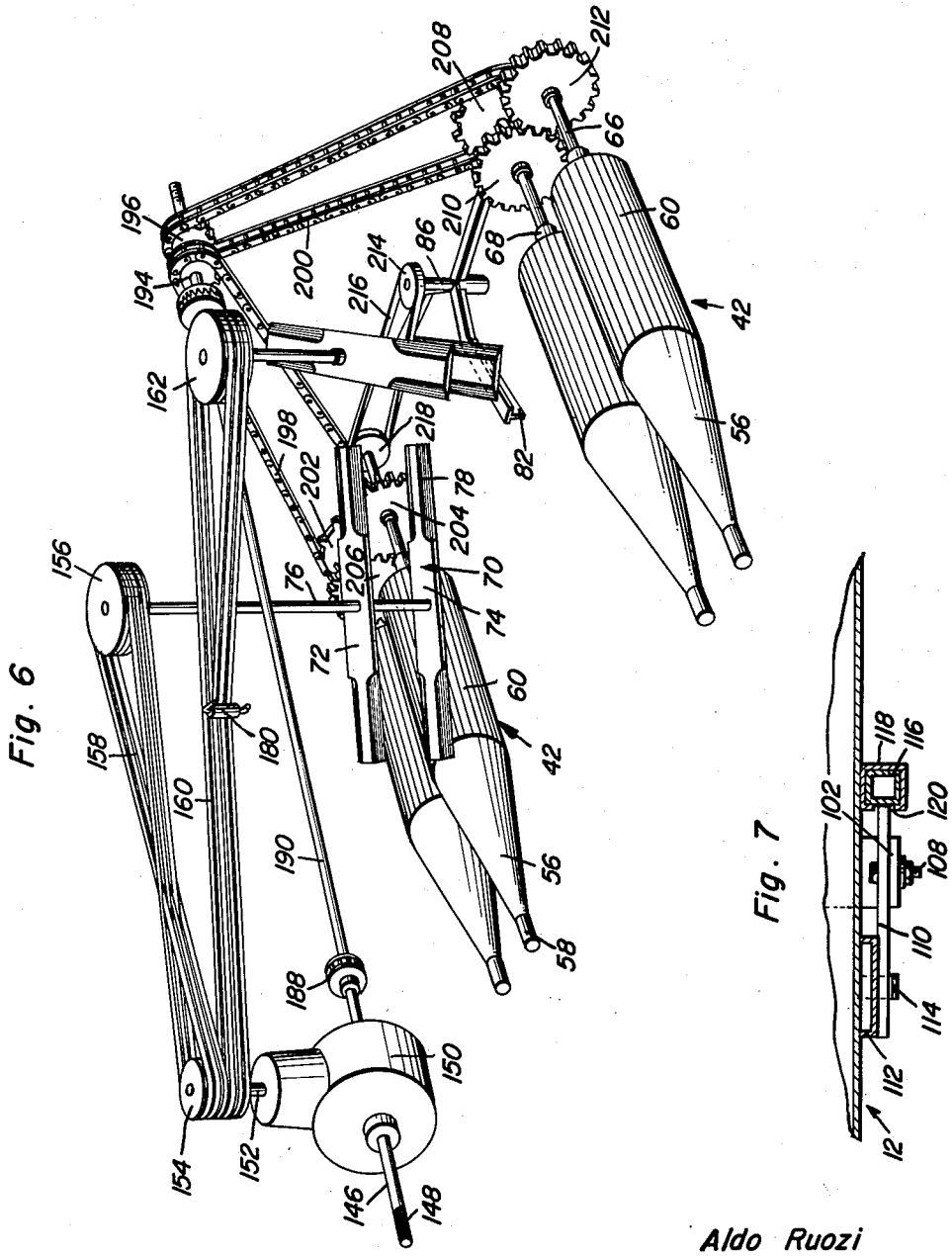

United States Patent Office 3,160,214
Patented Dec. 8, 1964

3,160,214
STALK AND ROOT LIFTING AND
SHREDDING DEVICE
Aldo Ruozi, 120 S. Liggett St., Bakersfield, Calif.
Filed Nov. 7, 1962, Ser. No. 235,935
8 Claims. (Cl. 171—58)

The present invention generally relates to a stalk and root lifting and shredding device, and more particularly is concerned with new and useful improvements in such a device whereby stalks are effectively removed from the ground, shredded and spread evenly over the upturned earth thereby providing, in addition to a device for clearing the field for subsequent crops, a means for maintaining the humus contact deemed essential for continued productivity.

A significant object of the present invention is to provide a device, mounted on a wheeled frame for attachment to a tractor, incorporating means for digging and extracting cotton roots and subsequently raising both the stalks and the roots, shredding the stalks and roots and scattering the shredded particles over the dug-up soil thus eliminating the necessity of any subsequent disking and plowing prior to planting with the exposure to sunlight and air of any diseased plants providing an effective means for eliminating the cause of the disease and the spread thereof.

Another significant object to the present invention is to provide a device which by total uprooting of the stalk and the subsequent shredding and scattering thereof, provides an effective means for aerating the soil and maintaining the humus content.

An additional object of the present invention is to provide a device which substantially reduces the compaction of the soil and increases water penetration.

These and other objects which will be appreciated from the foregoing detailed description are accomplished by the provision of two pairs of lifting rollers which receive the stalks guided therein by guide means. The lifting rollers, having lifting bars thereon, proceed to lift the stalks while the roots thereof are broken loose and lifted by plow means in line with the rollers and including a vertically extending earth separating bar. Compound blade assemblies, positioned over the lifting rollers, shred the raised stalks as well as the roots after which the residue is evenly spread by a debris spreader assembly thus resulting in an effective one pass means for speeding up the decomposition of the stalks and roots, the destruction of the breeding environment for various parasites, the aeration of the soil, and the elimination of bothersome roots, all accomplished with a substantial decrease in both the time and cost normally expended.

These together with other objects and adavntages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the device of the present invention;

FIGURE 2 is a front elevational view of the device in FIGURE 1;

FIGURE 3 is a rear elevational view of the device in FIGURE 1;

FIGURE 5 is a bottom plan view;

FIGURE 6 is a diagrammatic perspective view with parts removed so as to illustrate the various power driven components of the present;

FIGURE 7 is a cross sectional view taken substantially on the plane passing along line 7—7 in FIGURE 1;

FIGURE 8 is a cross sectional view through a modified form of the roller drum wherein a removable sleeve is used; and FIGURE 9 is a cross sectional view similar ot FIGURE 8 illustrating another form of removable sleeve.

Figure 4:
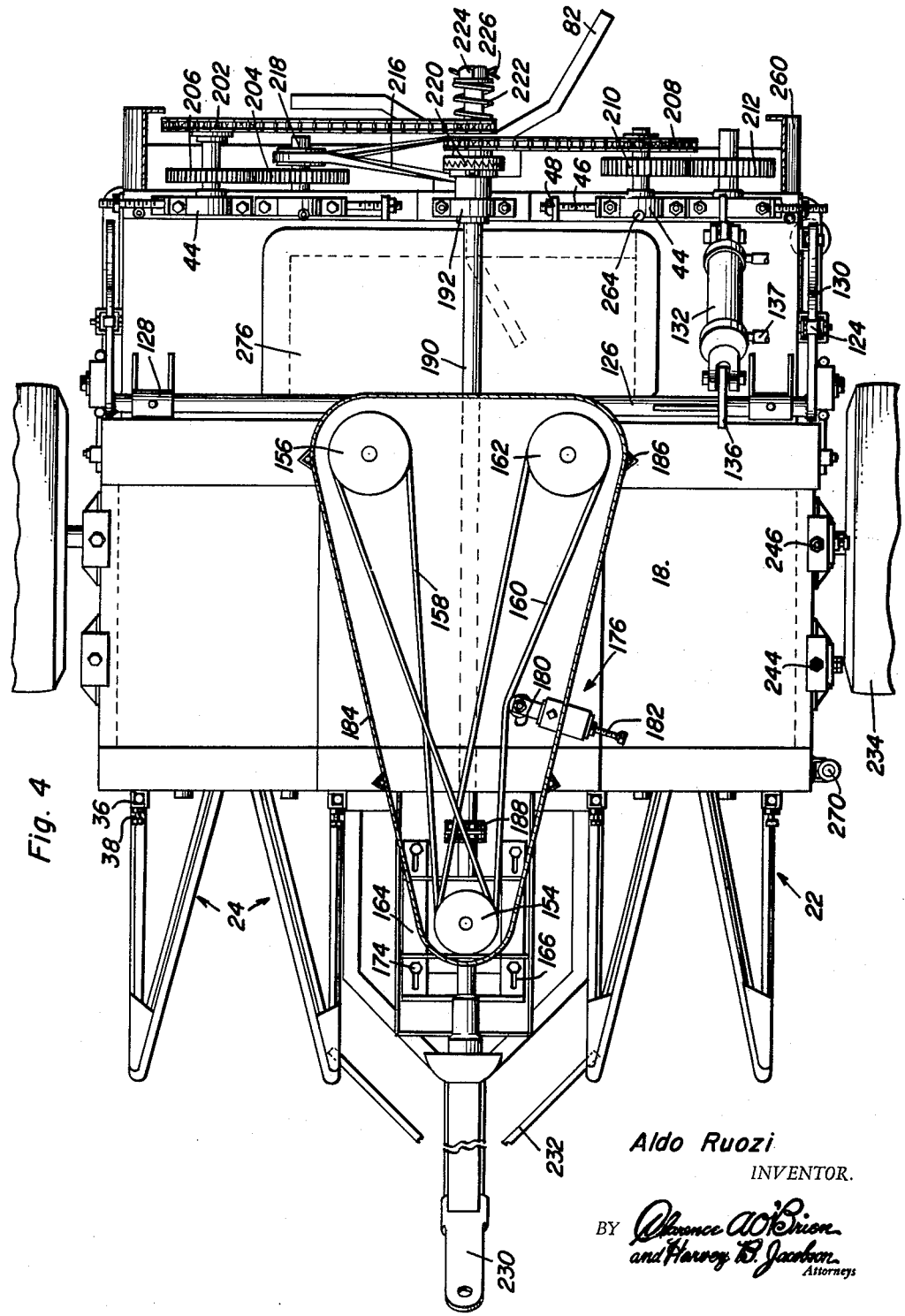
FIGURE 4 is a top plan view.

Referring now more particularly to the drawings, reference numeral 10 generally indicates the shredding device comprising the present invention. This device 10 includes a frame 12 provided with side panels 14, a rear panel 16, a top panel 18, and an open bottom in communication with two reduced openings 20 at the front of the frame 12, thus forming an enclosed chamber or housing for the reception of the stalks and roots to be lifted, shredded, and scattered.

Mounted on and projecting forwardly from the frame 12 are stalk guide assemblies 22, one such assembly in line with each of the stalk receiving openings 20 for the guiding of the stalks. Each of these assemblies 22 consists of two subassemblies 24 each including a substantially horizontal bar 26 extending forwardly and, at its forward end being rigidly affixed to rearwardly extending bars 28 and 30 which are in converging relationship with similar bars on the cooperating subassembly 24. As will be best appreciated from FIGURE 2, the bar 28 extends upwardly at a lesser angle than the bar 30 thereby providing an effective means for guiding the stalks along a major portion of the height thereof with the stalks being maintained in a substantially vertically orientation. Suitable gusset plate means 32 are used to rigidify the forward or leading end of the subassemblies 24 with the entire subassembly being mounted for vertical adjustment relative to the frame, such a mounting being effected by providing a vertically bent inner end 34 on the horizontal rod 26 with this inner end 34 being received within a socket 36 and fixedly maintained in an adjusted position by a suitable locking means such as setscrew 38.

A pair of bearings 40 are provided at the forward end of the frame 12 within each opening 20 at the lower end thereof with the bearings 40 projecting inwardly toward each other. The lifting rollers 42 are rotatably received within the bearings 40 with adjustably mounted bearings 44 being provided on the rear of the frame 12 in line with the bearings 40 for the reception of the rear end of the lifting rollers 42, the adjustment of the bearings 44 being effected by an adjusting rod 46 threaded through a lug 48 welded to the frame 12 with attaching bolts 50 being received through elongated slots 52 provided in a subjacent rearwardly projecting flange 54 on the frame 12, the bolts 50 being loosened during an adjustment of the corresponding bearing 44 by means of the rod 46 and subsequently tightened so as to maintain the bearing 44 in its adjusted position.

As will be appreciated, the rollers 42 are provided in pairs with one pair in alignment with each opening 20 and positioned so as to receive the stalks guided therein by the guide assemblies 22. The rollers 42, extending parallel to each other and longitudinally of the frame 12, each includes an elongated conical end 56 terminating in a forwardly projecting journal portion 58 which is received within a bearing 40. The main body of the roller 42 consists of a cylindrical drum 60 having a plurality of longitudinally extending outwardly projecting circumferentially spaced lifting bars 62 secured thereto, these bars 62 preferably having roughened surfaces thereon so as to provide a positive grasping and lifting of the stalks. In order to provide for a smooth transistion between the conical portion 56 of the rollers 42 and the lifting bars 62, it is contemplated that the forward end 64 of the bars 62 taper at substantially the same angle as the taper of the conical portion 56. The rear end of each of the rollers 42 is reduced as at 66 with this reduced rear portion 66 being substantially elongated for reception within he rear bearings 44 as well as the mounting of the roller drive means as shall be gone into presently. These rollers 42 can, if so desired, be constructed by the use of a single elongated shaft, which in the above description would form both the forwardly projecting portion 58 and the rearwardly projecting reduced portion 66, with the conical portion and the cylindrical portion 60 being hollow and suitably mounted on the shaft by means such as the collars 68.

Also, as noted in FIGURES 8 and 9, the present invention contemplates the use of interchangeable sleeves on the cylindrical drum 60, such as for example, a metal sleeve 61 having a rubber or the like outer surface 63 provided with ribs 65 similar to lifting bars 62, or a sleeve 67 in the form of a brush having bristles 69 of steel or nylon projecting radially therefrom. The use of such interchangeable sleeves would of course require that the drum be smooth with the sleeves secured thereto by screw means 71.

Located above the rollers 42 in a position so as to receive the stalks lifted thereby are two cutter assemblies 70, each assembly consisting of an upper blade 72 and a lower blade 74 mounted on a vertically extending shaft 76 rotatably received within a bearing 78 secured to the top portion 18 of the housing or frame 12. It is contemplated that the blades 72 and 74 be provided with cutting edges 78 on each side thereof so as to enable the blades to be changed from one shaft 76 to the other upon the dulling thereof, these shafts 76 being rotated in opposite directions, the upper shaft in FIGURE 5 rotating counterclockwise and the lower shaft rotating clockwise thereby both completely shredding the stalks and depositing the residue on the rearwardly located spreader assembly 80. It will, of course, be appreciated that the upper and lower blades 72 and 74 on each of the shafts are vertically offset from each other so as to avoid any contact therebetween inasmuch as such blades are intended to overlap each other as will be appreciated from FIGURE 5.

The spreader assembly 80 consists of three horizontally extending arms 82, T-shaped in cross section and angularly bent at a point 84 intermediate their length. These arms 82 are rigidly affixed to a vertical shaft 86 for rotation therewith, the shaft being journaled within a bearing 88 which is in turn adjustably mounted in a horizontally extending sleeve 90 affixed to the rear of the frame 12, the adjustment being effected by an adjusting rod 92. As will be appreciated, the stalks and roots, upon being shredded by the blade assemblies 70, drop rearwardly toward the spreader assembly 80 which, continually rotating, quickly and effectively spreads the residue or debris in a smooth pattern over the plowed earth.

To effect both the desired plowing of the earth and a complete removal of the stalk and roots, a plow assembly 94 is provided in conjunction with each pair of rollers 42 and is located toward the rear end of the cylindrical portions 60 thereof. Each plow assembly consists of a digger blade 96 located vertically below and centrally between the rollers generally rearward of the forward ends of the cylindrical portions 60. Each blade 96 is substantially triangular in plan with the apex 98 thereof extending forwardly and slightly downwardly and with the entire body thereof being slightly bowed transversely of the line of travel so as to effect the desired upward movement of the stalks and roots, a vertically extending triangular blade 100 being located centrally thereon so as to facilitate the opening of the earth thus further facilitating the release of the entire stalk and root system. In order to properly orientate each digger blade 96, a vertical standard 102 is provided with the lower portion 104 of the standard 102 being angularly bent so as to properly position the digger blade 96 with the vertically extending center blade 100 being located substantially between the two rollers 42 of the adjacent pair of rollers. Each standard 102 is provided with a plurality of apertures 106 vertically spaced along the upper extremity thereof with these apertures 106 selectively receiving bolts 108 therethrough which are used to rigidly affix the standard 102 to a vertically adjustable plate 110 so as to enable an additional vertical movement of the plow assembly 94 by a vertical adjustment of the plate 110. This plate 110, horizontally elongated, has the forward end thereof located between a channel member 112 affixed to the frame 12 and a guide strap 114 spaced slightly therefrom so as to form a vertical guide means for the plate 110. The rear end of the plate 110 is welded to a vertically extending rectangular shaft 116 received within a vertically extending guide tube 118 secured to the frame 12. This guide tube 118 is provided with a slot 120 at the forward side thereof so as to allow the plate 110 to pass therein. The upper end of the shaft 116 is provided with a bifurcated portion 122, upper and lower freely rotatable rollers 124 being provided between the bifurcated portion. The foregoing structure is duplicated at both sides of the frame 12 with a control shaft 126 extending transversely of the frame 12 and rotatably mounted within suitable bearings 128 slightly forward of the tubular guide 118 and slightly above the upper end thereof. In order to effect the vertical movement of the shaft 116 so as to produce a vertical movement of the plow assembly 94, a rearwardly projecting arcuate rocker arm 130 is fixedly secured to the control shaft 126 for rotation therewith, the free end of the rocker arm 130 being loosely received between the rollers 124 thus enabling a vertical movement of the rectangular shaft 116 upon a rotation of the control shaft 126. This rotation of the control shaft 126 is effected by a hydraulic pump 132 pivotally mounted at one end by bracket means 134 to the frame 12 and at the other end to the outer end of a lifting arm 136 the inner end of which is fixedly secured to the control shaft 126. This lifting assembly is intended to be actuated by a single hydraulic pump 132 supplied with fluid in a conventional manner by lines 137 for producing the desired raising and lowering of the plow assembly 94, the degree of raising and lowering being further adjustable by a varying of the vertical relationship between the standard 102 and the plate 110 in each plow assembly 94.

After the roots of the stalks have been disengaged from the earth both by an upward lifting of the stalks by the rollers 42 and by the splitting and raising action of the digger blades 96, it will be appreciated that a substantial amount of dirt or mud will cling thereto, and accordingly, a mud guard 138 is provided immediately below the rollers 42 adjacent the rear end of the cylindrical portion 60. The mud guard 138, one being provided for each pair of rollers 42, is bifurcated with the inner edges 140 of each furcation converging slightly toward the other thus tending to restrict the roots passing therebetween and causing a loosening of the dirt or mud. These mud guards 138 are to be mounted on elongated bars 142 secured to and depending from the frame 12 by bolts 144, the horizontal adjustment thereof being provided for by the provision of elongated slots through the rear portions of each of the mud guards 138, the bolts 144 being received through the slots.

The means for effecting the desired movement of the roller assemblies, cutter blade assemblies and spreader assembly consist essentially of a horizontally extending drive shaft 146, the forward end 148 of which is externally splined for coupling to the power takeoff shaft of a tractor. A gear box 150 is provided about the drive shaft 146 with the gear box 150 connecting the drive shaft 146 through gearing (not shown) to a vertically extending shaft 152 having a multi-grooved pulley 154 mounted thereon with this multi-grooved pulley 154 being connected to a multi-grooved pulley 156 on the vertically extending shaft 76 of the lefthand blade assembly in FIGURE 6 by endless belts 158. These endless pulley belts 158 are crossed, with the endless pulley belts 160 extending between the multi-grooved pulley 154 and the multi-grooved pulley 162 on the righthand blade assembly being uncrossed thereby enabling the rotation of these blade assemblies in the manner set forth supra with one going clockwise and one counterclockwise. In order to insure the desired tightness in the belts 158 and 160 the gear box 150 is adjustably mounted slightly forward of the frame 12 on a base 164 having four elongated slots 166 therethrough. This base 164 with the gear box 150 mounted thereon is moved horizontally either forwardly or rearwardly relative to a subjacent framework 168 by means of an adjusting rod 170 extending through an upwardly projecting lug 172 secured to the forward portion of the framework 168, this framework 168 having apertures therethrough corresponding to the location of the slots in the base 164 so as to receive bolts 174 therethrough thus enabling the rigid fixing of the position of the gear box 150 and consequently the tension in the belts 158. After the tension of the belts 158 has been set in such a manner, the tension in the belts 160 is adjusted by means of the idler assembly 176 which consists of a standard 178 projecting upwardly from the frame 12 and having a roller 180 adjustably maintained in contact with the belts 160 by adjusting means 182. If so desired, a suitable housing 184 can be provided about the belts and pulleys with the housing maintained in position by vertically extending members 186 secured to the frame 12.

In order to facilitate the removal of the gear box 150 as well as reduce the shock load on the gear box bearing, it is contemplated that a chain coupling 188 be provided rearward of the gear box 150 between the shaft 146 and the coaxial shaft 190 extending rearwardly thereof.

This shaft 190 extends rearwardly beyond the frame 12 through a suitable bearing 192 mounting the shaft 190 on the frame. The rear portion of the shaft 190 is provided with two toothed gears 194 and 196 with drive chains 198 and 200 engaged thereabout and extending to the opposite roller assemblies. The drive chain 198, as viewed in FIGURE 6, is engaged about a gear 202 mounted on the rearward end of the shaft portion 66 of the outer roller with both this outer roller and the inner roller of the lefthand pair having meshed gears 204 and 206 provided between the gear 202 and the rear end of the cylindrical portion 60 thereby providing the desired lifting movement. The drive chain 200, also as viewed in FIGURE 6, is engaged about a gear 208 provided on the rearward end of the shaft 66 of the inner roller of the righthand pair of rollers with intermeshed gears 210 and 212 providing the desired movement of this righthand pair of rollers.

The spreader assembly means, having a pulley 214 provided at the upper end of its vertical shaft 86, is driven by a belt 216 extending about this pulley 214 and about a pulley 218 provided on the rear end of the shaft portion 66 of the inner lefthand roller.

In order to reduce any shock load into the shaft 190, it is contemplated that a slip clutch 220 be provided, a compression spring 222 and adjusting nut 224 including a retaining pin 226 being used in conjunction with the clutch 220.

As will be appreciated, it is contemplated that the device of the present invention be pulled by a tractor, and accordingly, a forwardly extending tongue 228 is provided with a hitch means 230 provided at the forward end thereof for pivotal attachment to a coupling or hitch pin of a tractor. As will be recognized from the drawings, this forwardly extending tongue is additionally used as a means for stabilizing the inner guide subassembly 24 with a bracing bar 232 extending to each subassembly.

The device comprising the present invention is to be provided with wheels 234 on the opposite sides thereof, these wheels 234 being rotatably mounted on stub axles 236. The inner ends of the stub axles 236 are secured to a vertically extending plate 238 which can be slidably and adjustably received within either forward channels 240 or rear channels 242, both secured to the sides of the frame 12 and having adjustment rods 244 and 246 mounted thereon and extending through transverse plates 248 and 250 at the upper ends thereof. The wheels 234 are to be positioned in the rear channel sockets 242 so as to facilitate road travel with the wheels 234 being placed in the front channel sockets 240 for field work, such an arrangement transferring the weight to the rear of the device in the area of the plow assemblies 94.

Referring now specifically to FIGURE 1, it will be noted that the frame 12 also has a pair of vertically adjustable legs 252 mounted thereon with the legs 252 being received within vertical guides 254 and fixed thereto in a predetermined adjusted position by setscrews 256, the legs 252 having an enlarged foot portion 258 thereon. These legs 252 are of importance as both a means for stabilizing the device during periods of non-use as well as a means for supporting the rear portion of the device while the front portion thereof is supported by the tractor so as to enable a changing of the wheels.

With continued reference to FIGURE 1, it will be noted that a protective housing 260 is provided about the rear chain assembly, this housing or guard 260 being releasably retained in brackets 262 by annular rod members 264. Additionally, it is contemplated that rear guard shields 266 also be provided for the protection of the various roller gears. Finally, a guard rail 268, arcuate in shape, is provided in a manner so as to encircle the spreader assembly 80 to a point spaced thereabove so as to prevent any accidental contact therewith.

Releasably secured along the forward edge of one side of the frame 12 is an elongated bar 270 having a tapered end thereon and functioning as a utility tool to assist in the various maintenance tasks required such as the adjusting of the plow assembly. This utility bar 270 is releasably fixed within a tubular socket 272 by a setscrew 274, the socket 272 being welded to the frame 212.

To provide access to the interior of the frame 12, various removable panels or lids 276 may be provided. One such lid is illustrated in FIGURE 4.

From the foregoing, the manner of operation of the invention should be readily apparent. As the frame is pulled forward the stalks are guided between the lifting rollers first by the guide assemblies 22 and then by the conical forward portion 56 of the rollers. Upon reaching the cylindrical portion 60 of the rollers 42 the stalks are engaged by the longitudinal rods 64 secured thereto and a lifting of the stalks begins with the upper portion of the stalks being rapidly shredded or cut up by the blade assemblies 70 as the stalks appear above the rollers. While the stalks are being lifted upward by the rods 64 and portion 60 of the rollers 82, the plow assembly 94 is splitting apart the earth and lifting up the stalk roots so as to enable a lifting of the entire system, both stalks and roots, while at the same time providing a plowed ground for a subsequent planting. As the roots of the stalks approach the rollers 42 they are engaged by mudguards which tends to knock mud from the roots. After the shredding by the cutter blade assembly, the residue is directed rearwardly and spread outwardly in a smooth pattern by the spreader assembly 80 in constant rotation. Accordingly, it has been shown that the novel device has been defined which, in a single path across a field, completely uproots and shreds cotton stalks and roots while at the same time conditioning the soil for a subsequent planting without any additional plowing or turning of the soil being necessary. Also, as will be appreciated, the use of the present device provides an effective means for maintaining the humus content of the soil as is necessary if productivity is to be maintained, and, additionally controlling various types of root rot and fungi growth.

The foregoing is considered as illustrative only of the principles of the invention. Further, since numerous modifications and changes will readily occur to those

What is claimed as new is as follows:

1. A root and stalk shredder comprising a movable frame, a pair of longitudinally extending parallel power driven lifting rollers rotatably mounted on said frame, said rollers including cylindrical portions rearward of the forward ends thereof, guide means mounted on said frame forward of said rollers for guiding stalks therebetween, a blade assembly mounted on said frame over the rollers and operatively associated therewith for cutting roots and stalks lifted by the rollers, and a plow assembly mounted on said frame, said plow assembly including an earth engaging digging blade located vertically below and centrally between the rollers generally rearward of the forward ends of the cylindrical portions thereof along the path of travel of the frame so as to effect a splitting of the earth and a freeing of the roots subsequent to an initial grasping of the stalks by the rollers.

2. The structure of claim 1 including a duplicate pair of rollers mounted on said frame parallel to and laterally spaced from the first mentioned pair, said duplicate pair of rollers including a duplicate guide means, a duplicate blade assembly and a duplicate plow assembly, said blade assemblies each including a vertical rotatably mounted shaft, upper and lower horizontal blades on each shaft, the path of movement of the blades of one blade assembly overlapping the path of movement of the blades of the other blade assembly, the blades of one blade assembly being vertically offset from the blades of the other blade assembly so as to avoid contact therebetween, both of said assemblies being rotatable inwardly and rearwardly so as to project the cut material rearwardly between the blade assemblies.

3. The structure of claim 2 including a spreading means mounted on the frame rearward of and centrally between the two blade assemblies, said spreading means including a rotatably mounted vertical shaft and a plurality of outwardly extending horizontal arms mounted on the spreader shaft below the plane of the blade assemblies for receiving the cuttings from the blade assemblies and effecting a rearward and lateral spreading thereof.

4. The structure of claim 1 wherein said digging blade is generally horizontally orientated with a slight forward and downward inclination so as to engage beneath the roots and effect a raising thereof upon a forward moving of the frame.

5. The combination of claim 4 wherein said guide means consists of two opposed subassemblies, each including a substantially horizontal bar extending forwardly from said frame, said bar having a vertically bent inner end adjustably received within a socket fixed to the frame, and two rearwardly and upwardly sloping bars secured to the forward end of said horizontal bar, one of said sloping bars extending upwardly at a greater angle than the other, the sloping bars of the two opposed subassemblies converging toward each other.

6. The structure of claim 4 wherein said digging blade includes a centrally located upwardly projecting vertical splitting blade for splitting the earth as the roots are raised.

7. The structure of claim 4 including a mud guard mounted on the frame between the digging blade and the rollers and slightly to the rear of the digging blade so as to engage the raised roots and remove the soil therefrom.

8. The structure of claim 7 wherein said mud guard is generally horizontally orientated and includes a forwardly directed bifurcated portion, the inner edges of the furcations converging slightly toward each other so as to receive the roots therebetween.

References Cited in the file of this patent

UNITED STATES PATENTS

| | | |
|---|---|---|
| 2,544,023 | Johnson | Mar. 6, 1951 |
| 2,704,919 | Barnes | Mar. 29, 1955 |